March 17, 1925.

O. T. SODERGREN

DRIVE PULLEY RELEASE

Filed Aug. 4, 1924

1,529,751

Inventor:
Otto T. Sodergren
By
Wilson and McLean Attys.

Patented Mar. 17, 1925.

1,529,751

UNITED STATES PATENT OFFICE.

OTTO T. SODERGREN, OF ROCKFORD, ILLINOIS.

DRIVE-PULLEY RELEASE.

Application filed August 4, 1924. Serial No. 729,943.

*To all whom it may concern:*

Be it known that I, OTTO T. SODERGREN, a citizen of the United States, residing at Rockford, in the county of Winnebago and State of Illinois, have invented certain new and useful Improvements in Drive-Pulley Releases, of which the following is a specification.

This invention relates in general to machine elements and has more particular reference to a drive pulley release, that is, a drive pulley or the equivalent which will automatically release from the driven member when the resistance becomes excessive or exceeds a predetermined pressure. A device of this kind might be termed a self-acting stop clutch and is especially adapted for use in the transmission of power to machines where it is desired to disconnect the driving and driven parts immediately upon the resistance exceeding a predetermined pressure as, for example, when for any reason the machine does not function properly and sets up an excessive resistance.

The primary purpose of my invention is to provide an improved drive pulley release or device of the character described which may be applied to any machine or in any driving train for automatically disconnecting the driving and driven parts when the resistance reaches an excessive or danger point. The principle and mode of operation of my improvements will be apparent from the following description when considered in connection with the accompanying drawing, in which—

Figure 1:
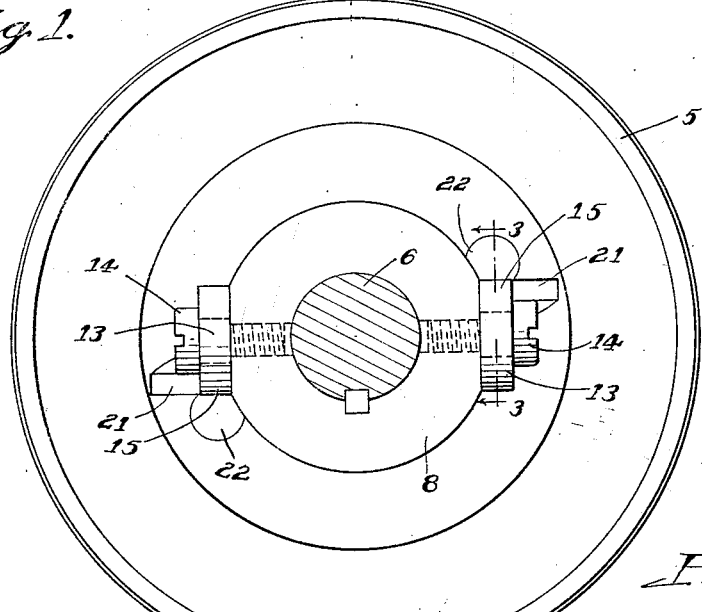
Figure 1, is an end view of a device of the character described embodying my invention.

In the present embodiment of my invention the driving member is in the form of a pulley designated generally by 5 and the driven member a shaft 6. The pulley is loosely journaled upon a sleeve 7 keyed or otherwise suitably secured to the shaft 6. Except as influenced by the action of the driving dog and compression spring as will be presently described the pulley is free to revolve and slide lengthwise upon the sleeve 7. The sleeve has formed integrally therewith at one end a head 8 having a shoulder 9 against which the pulley is normally urged by a compression spring 11. Stop collars 12 threaded on the sleeve 7 may be adjusted thereon for varying the pressure of the spring.

One or more drive-transmitting and releasing dogs 13 act between the pulley 5 and collar 8 for establishing driving connection there-between and for automatically releasing the pulley from the head and consequently the driven shaft when the resistance of the latter becomes excessive. In the present instance two dogs are employed, each being pivotally attached to the head 8 on diametrically opposite sides thereof by a machine screw 14. These screws are coaxially disposed and each is radial with respect to the shaft 6. Each dog is preferably formed of flat material and has a laterally offset driving nose 15 which is in a plane circumferentially spaced from its pivot axis as viewed from Fig. 1 and offset laterally therefrom, that is, lengthwise of the driven shaft as shown in Fig. 2. The nose 15 of each dog has a thrust face 16 parallel with the axis of the shaft 6 and a face 17 at right angles thereto. The face 16 connects to the body proper of the dog by an arcuate face 18 which merges into one of the parallel sides 19 of the dog body. The dogs are arranged as shown in Fig. 1 so that their driving noses are disposed on opposite sides of the diametrical plane in which the pivot bolts are disposed so that the dogs will drive in a common direction.

Figure 3:
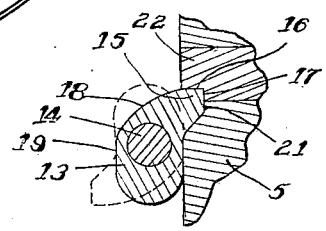
Fig. 3, is a fragmentary section taken on the line 3—3 of Fig. 1.

The driving pulley has formed in its face contiguous to the shoulder 9 on the dog-carrying head 8, recesses 21 complemental to and shaped to receive the offset driving ends of the dog. A hardened steel plug 22 is inserted in the pulley adjacent to each recess 21 and cut away in conformance with the shape thereof so as to provide hardened surfaces against which the faces 16 and 17 of the respective dog engages, as shown plainly in Fig. 3.

Figure 2:
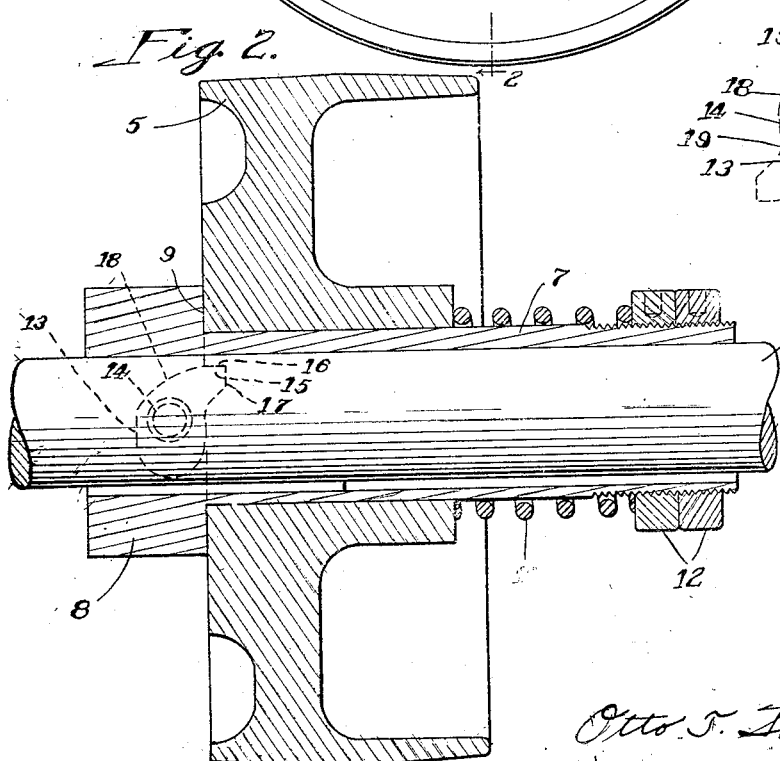
Fig. 2, is a section taken substantially on the line 2—2 of Fig. 1.
Figure 4:
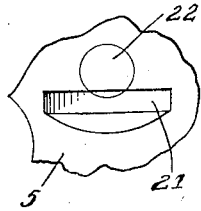
Fig. 4, is a face view of one of the dog-engaging recesses in the driving pulley.

With the foregoing organization of parts it will be manifest that when the drive pulley is revolved in a clockwise direction viewing Fig. 1 it will transmit rotary motion to the shaft 6 through the intermediary of the dogs 13 and the sleeve 7, it being manifest that the compression spring 11 yieldingly holds the pulley engaged with the dogs. In view of the offset relation of the driving faces of the dogs there is a component of pressure tending to turn the dogs on their respective pivot bolts and force the pulley lengthwise against the pressure of the spring 11. The spring however is of sufficient pressure to overcome this component and hold the pulley in driving connection with the dogs. When, however, the resistance of the shaft 6 overcomes the pressure of the spring the dogs will be turned on their pivot bolts by the greater driving pressure of the pulley and the latter will yield lengthwise against the pressure of said spring to accommodate said movement of the dogs, until the offset end of each dog is entirely removed from its complemental recess 21, as shown in dotted lines in Fig. 3, thereby disconnecting the pulley and shaft. These parts remain disconnected until manually replaced in their operative driving relation.

It is believed that the foregoing conveys a clear understanding of the objects prefaced above and while I have illustrated but a single working embodiment it should be understood that changes might be made in details of construction without departing from the spirit and scope of the invention as expressed in the appended claims, in which—

I claim:

1. In combination, a driving and a driven member in coaxial relation, a drive-transmitting dog pivotally mounted on the driven member on an axis radial with respect thereto, a recess in the driving member in which the dog is adapted to engage in drive-transmitting contact, a spring yieldingly urging the driving member axially of the driven member for maintaining said drive-transmitting contact, the driving end of the dog being spaced from its pivot axis circumferentially and lengthwise of the axis of said members, whereby a component is produced by the driving pressure tending to tilt said dog and force the driving member axially against said spring pressure, said spring pressure being such as to normally overcome said component and to permit the dog to tilt and the driving member to release from the dog when the resistance of the driven member becomes excessive.

2. In combination, a shaft, a sleeve keyed thereon and having a head at one end, a pulley journaled on the sleeve, a spring urging the pulley against said head, a dog pivotally mounted on the head on an axis radially disposed with respect to the shaft, and a recess in the pulley adjacent to the head in which recess the dog is adapted to normally engage for establishing driving connection in one direction between the pulley and shaft, the end of the dog engaged in the pulley recess being offset from the pivot axis of the dog both circumferentially and longitudinally of the pulley axis, whereby to provide a release connection between the pulley and shaft in which the pulley will be axially displaced against said spring pressure by tilting of the dog under the influence of excessive resistance.

OTTO T. SODERGREN.